(12) United States Patent
Jagannathan et al.

(10) Patent No.: US 11,455,445 B2
(45) Date of Patent: Sep. 27, 2022

(54) METHOD AND SYSTEM FOR NON-INTRUSIVELY INSPECTING A FLUIDIC CHANNEL

(71) Applicant: HALLIBURTON ENERGY SERVICES, INC., Houston, TX (US)

(72) Inventors: Srinivasan Jagannathan, Houston, TX (US); Oluwatosin Ogundare, Katy, TX (US); Terry Bickley, Humble, TX (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 499 days.

(21) Appl. No.: 16/474,700

(22) PCT Filed: Oct. 15, 2018

(86) PCT No.: PCT/US2018/055903
§ 371 (c)(1),
(2) Date: Jun. 28, 2019

(87) PCT Pub. No.: WO2020/040800
PCT Pub. Date: Feb. 27, 2020

(65) Prior Publication Data
US 2021/0357557 A1    Nov. 18, 2021

Related U.S. Application Data

(60) Provisional application No. 62/765,220, filed on Aug. 20, 2018.

(51) Int. Cl.
*G06F 30/28*     (2020.01)
*G06F 113/08*    (2020.01)

(52) U.S. Cl.
CPC .......... *G06F 30/28* (2020.01); *G06F 2113/08* (2020.01)

(58) Field of Classification Search
CPC ...... G06F 30/28; G06F 2113/08; G06F 30/20; E21B 47/107; E21B 47/085; G01B 13/10; F17D 1/08; F17D 5/00; F17D 5/06
See application file for complete search history.

(56) References Cited

U.S. PATENT DOCUMENTS

2006/0293857 A1    12/2006   Moos et al.
2012/0227499 A1*    9/2012   Amir ................... G01M 5/0025
                                                    73/602

(Continued)

FOREIGN PATENT DOCUMENTS

FR         2754898 A1    4/1998
WO      2016195645 A1   12/2016

OTHER PUBLICATIONS

Silva et al., "Vibration analysis for fouling detection using hammer impact test and finite element simulation," FMTC 2008 Measurement and Technology Conference, pp. 1-5 (2008) (Year: 2008).*

(Continued)

*Primary Examiner* — Steven W Crabb
(74) *Attorney, Agent, or Firm* — Novak Druce Carroll LLP (57) ABSTRACT

A method is provided for non-intrusively determining cross-sectional variation of a fluidic channel. The method includes creating a pressure pulse in a fluidic channel using a hammer to strike an external surface of a fluidic channel. The method also includes sensing, by one or more sensors, reflections of the pressure pulse; and obtaining, from the one or more sensors, a measured pressure profile based on the sensed reflections of the pressure pulse. A forward model of cross-sectional variation of the fluidic channel is generated based on a baseline simulation. Using the forward model, a simulated pressure profile is generated. Using the measured pressure profile and the simulated pressure profile, an error is determined. When the error is outside a predetermined (Continued)

threshold, the forward model is updated based on the error. An estimate of cross-sectional variation of the fluidic channel based on the forward model is displayed.

17 Claims, 8 Drawing Sheets

(56) References Cited

U.S. PATENT DOCUMENTS

| | | |
|---|---|---|
| 2014/0048283 A1 | 2/2014 | Mohon et al. |
| 2016/0237759 A1* | 8/2016 | Li-Leger ............... G10K 11/004 |
| 2016/0258287 A1 | 9/2016 | Kolle |
| 2016/0265351 A1 | 9/2016 | Gajji et al. |
| 2016/0370325 A1 | 12/2016 | Yusuf et al. |
| 2018/0087372 A1 | 3/2018 | Stokely et al. |
| 2020/0309741 A1* | 10/2020 | Giunta ................ G01M 5/0066 |

OTHER PUBLICATIONS

Sharp, D.B. et al., "Leak detection in pipes using acoustic pulse reflectometry," Acta Acustica united with Acustica 83.3; 1997: 560-566.

Tolstoy, A. et al., "Detecting pipe changes via acoustic matched field processing," Applied Acoustics; 70.5; 2009: 695-702.

Vidal, J.L.A. et al., "Acoustic reflectometry for blockage detection in pipeline," Offshore Technology Conference Brasil; Oct. 29-31, 2013; OTC 24294.

Pierozzi, N. et al., "Acoustic Technology for Large Obstruction Detection in Pipelines," Offshore Mediterranean Conference and Exhibition; Offshore Mediterranean Conference; 2017. Abstract.

International Search Report and Written Opinion; PCT Application No. PCT/US2018/055903; dated May 17, 2019.

Extended European Search Report for European Application No. 18931261.4, dated Jan. 10, 2022, 9 pages.

* cited by examiner

METHOD AND SYSTEM FOR NON-INTRUSIVELY INSPECTING A FLUIDIC CHANNEL

CROSS-REFERENCE TO RELATED APPLICATIONS

This application is a national stage entry of PCT/US2018/055903 filed Oct. 15, which claims to the benefit of U.S. Provisional Patent Application No. 62/765,220 filed on Aug. 20, 2018, the contents of each of the aforementioned are hereby expressly incorporated by reference in their entirety.

FIELD

The present disclosure relates generally to a system and method to determine cross-sectional variations of a fluidic channel. In particular, in at least one aspect, the present disclosure relates to a system and method to non-intrusively determine cross-sectional shape variations of a fluidic channel by creating a pressure pulse with a hammer external to the fluidic channel.

BACKGROUND

Wellbores are drilled into the earth for a variety of purposes including tapping into hydrocarbon bearing formations to extract the hydrocarbons for use as fuel, lubricants, chemical production, and other purposes. These hydrocarbons are often transmitted to processing plants via pipelines. Fluidic channels such as pipelines and wellbores need to be inspected to determine issues such as leaks, blockages by deposits, or structural erosion or damage.

Most methods for monitoring the integrity of fluidic channels are intrusive, such as using pigs, overhead drones, low flying airplanes, and the like. These methods can entail considerable investments in money and time. Additionally, these methods are intrusive and require specific dimensions and abilities to properly interact with the fluidic channels.

BRIEF DESCRIPTION OF THE DRAWINGS

Implementations of the present technology will now be described, by way of example only, with reference to the attached figures, wherein.

DETAILED DESCRIPTION

It will be appreciated that for simplicity and clarity of illustration, where appropriate, reference numerals have been repeated among the different figures to indicate corresponding or analogous elements. In addition, numerous specific details are set forth in order to provide a thorough understanding of the examples described herein. However, it will be understood by those of ordinary skill in the art that the examples described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

Disclosed herein are systems and methods for non-intrusively determining cross-sectional variation of a fluidic channel. In one or more examples, a measured pressure profile is obtained using pressure pulse technology which is then used to iteratively improve an estimation of cross-sectional variation of a fluid channel. When the error between the measured pressure profile and the modeled cross-sectional variation is within a curtained predefined threshold, a final cross-sectional variation is output as a function of range to show location of cross-sectional variation of the fluidic channel.

In order to obtain a measured pressure profile, pressure pulses are induced in the fluidic channel. Pressure pulses can be induced, for example, by a device including one or more hammers which are configured to strike the walls of the fluidic channel. By striking the walls, a pressure pulse can be generated. The device is positioned external to the fluidic channel. In other words, the device is outside of the fluidic channel and is not needed to be inserted into the annulus of the fluidic channel. As such, the device functions non-intrusively. One or more sensors measure a pressure profile based on the pressure pulses reflecting off of cross-sectional variations of the fluidic channel. The sensors are inserted into and/or mounted in the annulus of the fluidic channel by a port of the fluidic channel. The port may be a pre-existing port. As such, the sensors are also non-intrusive as there are no modifications or adjustments needed to the fluidic channel. The measured pressure profile may be forwarded to a data acquisition system, or a processing unit.

The data acquisition system also generates a forward model of cross-sectional variation of the fluidic channel. The forward model may be generated using an initial estimate of the cross-sectional shape at desired grid points and data regarding the pressure pulses. Based on the forward model, a simulated pressure profile is generated. An error is calculated using the measured pressure profile and the simulated pressure profile. If the error is not within a predetermined threshold, or in other words, when the error is too high or outside of the predetermined threshold, then the inputs to the forward model are updated. The updated forward model is adjusted based on the error. With the updated forward model, another simulated pressure profile is generated, and the error is calculated. If the error is once again outside of the predetermined threshold, then updating the forward model and subsequent steps are repeated until the error is within the predetermined threshold. If the error is within the predetermined threshold, then the forward model is output, and a model of cross-sectional variation of the fluidic channel is generated. Since the inputs to the forward model are updated based on the error, this method may reduce the time for processing loads and enables processing completion, for instance, by a factor of greater than 100. The resolution of such an inversion scheme can also be much higher. For example, instead of the resolution being in terms of kilometers, the resolution utilizing the method can provide resolution in terms of meters.

Figure 1A:
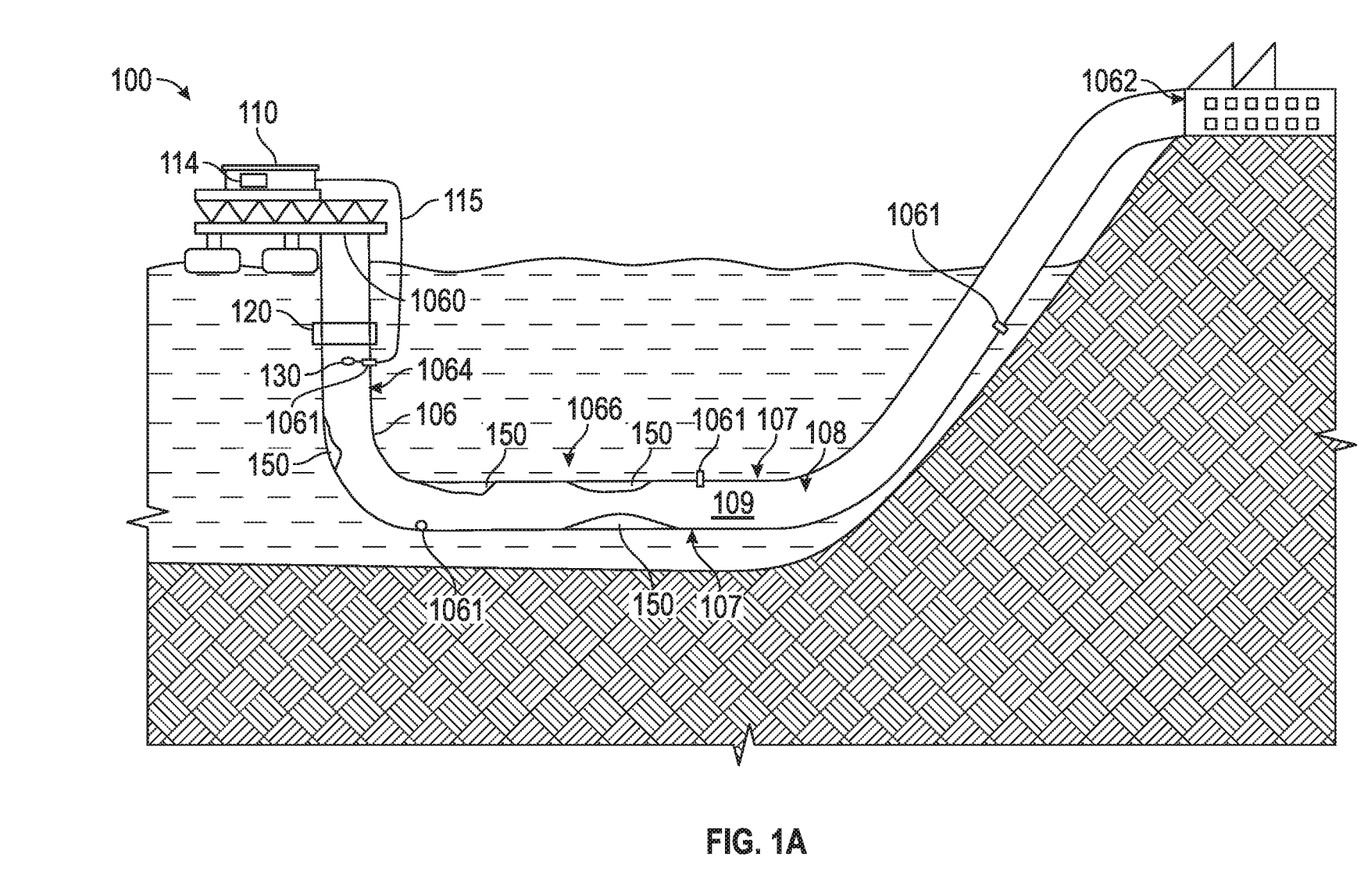
FIG. 1A is a schematic diagram of an exemplary environment for a system for determining cross-sectional variation of a fluidic channel according to the present disclosure.
Figure 1B:
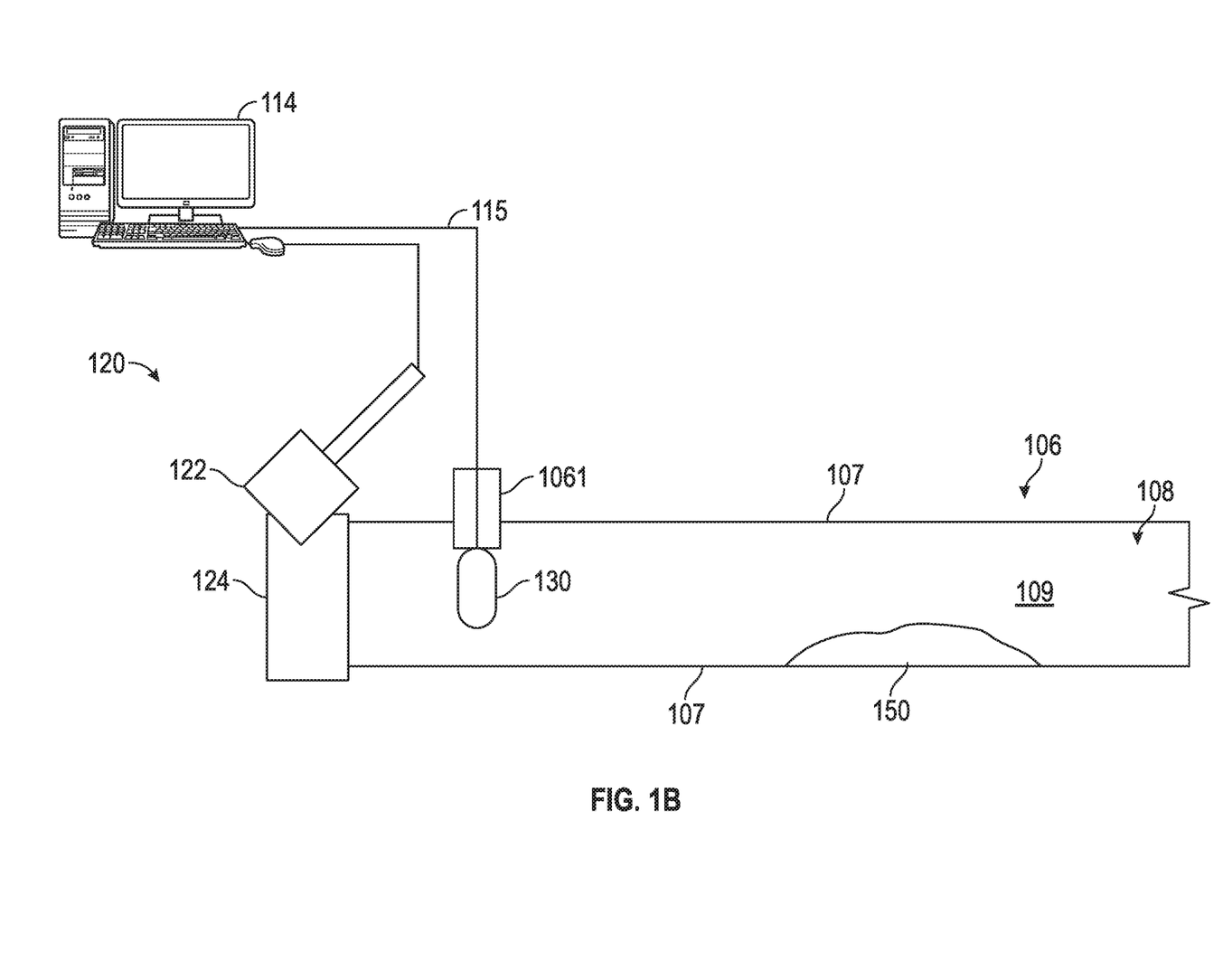
FIG. 1B is a schematic diagram of the system of FIG. 1A for determining cross-sectional variation of a fluidic channel.
Figure 1C:
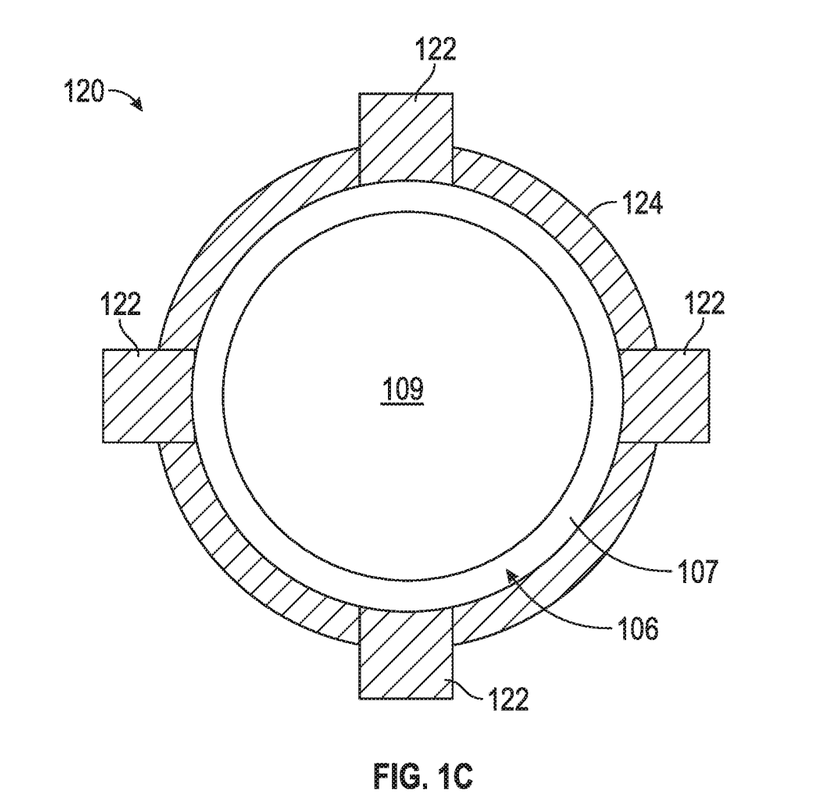
FIG. 1C is a schematic diagram of a device used in the system of FIGS. 1A and 1B.

The method can be employed in device 120 utilized in an exemplary system 100 shown, for example, in FIGS. 1A-1C. FIG. 1A illustrates a device 120 deployed in a fluidic channel 106. The fluidic channel 106 has a first end 1060 and a second end 1062. The fluidic channel 106 illustrated in FIG. 1A is a pipeline. In other examples, the fluidic channel 106 can be, for example, a pipeline, a wellbore, a drill string, or any channel through which fluid flows. Each of the first end 1060 and the second end 1062 are open such that the first and second ends 1060, 1062 are accessible by an operator and fluid can flow through the open ends. In other examples, the second end 1062 of the fluidic channel 106 is closed such that fluid cannot flow through the second end 1062. As such, the fluidic channel 106 can be, for example, a pipeline, a wellbore, a drill string, or any channel through which fluid flows. In at least one example, the first and second ends 1060, 1062 can be located along any point of the fluidic channel 106. For example, the first end 1060 may be located in the middle of the fluidic channel 106. The first end 1060 is any entry point to gain access to the fluidic channel 106. As illustrated in FIG. 1A, the fluidic channel 106 has a vertical section 1064 and a horizontal section 1066. In other examples, the fluidic channel 106 can extend only in one direction or multiple directions along any axis.

The fluidic channel 106 has walls 107 which form an annulus 109 through which fluid 108 can be contained in and flow. The fluid 108 can be one fluid or more than one fluid. The fluid 108 can include, for example, water and/or oil. The fluid 108 can also substantially fill the entire fluidic channel 106. In other examples, the fluid 108 can partially fill the fluidic channel 106. The walls 107 of the fluidic channel 106 can form a cross-sectional shape such as substantially circular, ovoid, rectangular, or any other suitable shape. The walls 107 of the fluidic channel 106 can be made of any combination of plastics or metals, suitable to withstand fluid flow without corrosion and with minimal deformation.

The fluidic channel 106 can also include one or more ports 1061. The ports 1061 extend through the walls 107 of the fluidic channel 106. As such, the ports 1061 permit communication across the walls 107 from external the fluidic channel 106 to the annulus 109 within the fluidic channel 106.

The system 100 includes a data acquisition system 114 which receives and processes data such that the data can be used and interpreted by a user. The data acquisition system 114 is located in a data center 110, which can be proximate to the first end 1060 of the fluidic channel 106. The data center 110 may be above ground, under water, underground, or located at any point to collect data. For example, the data center 110 may be an underwater vehicle such as a submarine. In other examples, the data center 110 may be located on a platform, as illustrated in FIG. 1A.

Referring to FIGS. 1A and 1B, along the fluidic channel 106, cross-sectional variations 1061 of the fluidic channel 106 may form. The cross-sectional variations 1061 can be a change of shape and/or cross-sectional area, for example, of the fluidic channel 106 any amount and in any shape and form to impede flow of the fluid. For example, in some areas, the cross-sectional variations 1061 may completely block the annulus 109 of the fluidic channel 106. Additionally, the cross-sectional variations 1061 may be to such an extent as to cause structural damage such as cracks in the walls 107 of the fluidic channel 106. Cross-sectional variations 1061 can be caused, for example, by deformation of the walls 107 of the fluidic channel 106 and/or deposits formed along the walls 107 of the fluidic channel 106. Deposits can be, for example, wax deposits, clay deposits, or any other possible deposits that can adhere to the walls 107 of the fluidic channel 106 such that the fluid flow is at least partly impeded.

In some areas, the fluidic channel 106 may not have any cross-sectional variations 1061. For example, the cross-sectional shape of the fluidic channel 106 can be substantially circular or any other desired shape as discussed above. In yet other areas, the fluidic channel 106 may have cross-sectional variations 1061. The change in shape of the fluidic channel 106 by the cross-sectional variation 106 can cause the cross-sectional shape of the fluidic channel 106 to be substantially ovoid, rectangular, diamond, triangular, irregular, or any other possible shape other than the original shape of the fluidic channel 106. As illustrated in FIG. 1B, the illustrated portion of the fluidic channel 106 has one portion with cross-sectional variations 1061. In other examples, the fluidic channel 106 can be more than one portion with cross-sectional variations 1061. In yet other examples, the fluidic channel 106 may not have any portions with cross-sectional variations 1061.

Cross-sectional variation 106 can include change in cross-sectional shape. Change in cross-sectional shape can be determined, for example, by change in a shape parameter. Shape parameter can be, for example, a dimension over a vertical axis and a horizontal axis, or a major axis and a minor axis. If the perimeter, or circumference, of the fluidic channel 106 remains constant during the change in cross-sectional shape, the cross-sectional area of the fluidic channel 106 will also change.

As the fluid flows through the fluidic channel 106 from a portion without cross-sectional variations 1061 through a portion with cross-sectional variations 1061, the fluid may experience turbulent flow. In at least one example, the fluid may be prevented from flowing across the portion of the fluidic channel 106 with cross-sectional variations 1061.

To obtain the measured profile, and inspect the fluidic channel 106 in a non-intrusive manner, at least one pressure pulse, such as a water-hammer pulse, can be induced. Referring to FIGS. 1A-1C, to induce the pressure pulses, a device 120 can be used. The device 120 can be actuated to create a pressure pulse that travels through the fluidic channel 106 at the local speed of sound in the medium. In at least one example, the device 120 is not a permanent fixture or attachment. As such, the device 120 can be coupled to the fluidic channel 106 only when needed to create pressure pulses. In other examples, the device 120 can be a permanent fixture in the fluidic channel 106. The device 120 includes one or more hammers 122 and a collar 124 coupled with the hammers 122. The collar 124 is configured to couple externally with the walls 107 of the fluidic channel 106. The collar 124, for example, can wrap around the walls 107 of the fluidic channel 106 to secure the device 120 to be in contact with and external of the fluidic channel 106. As such, to actuate a pressure pulse with the device 120, the device 120 is not deposited within the annulus 109 of the fluidic channel 106. The device 120 is non-intrusive, as the device 120 is positioned external to the fluidic channel 106.

As illustrated in FIG. 1C, the device 120 includes four hammers 122. The hammers 122 are substantially equidistantly positioned around the walls 107 of the fluidic channel 106. In other examples, the device 120 can include one, two, three, or more than four hammers 122. The hammers 122 can be placed at any suitable position, for example the hammers 122 can be positioned equidistantly. In other examples, the hammers 122 can be placed directly adjacent to one another or any other suitable pattern or placement. Also, as illustrated in FIG. 1C, the collar 124 wraps around the entire circumference of the fluidic channel 106. In other examples, the collar 124 can wrap only partially around the fluidic channel 106.

Figure 1D:
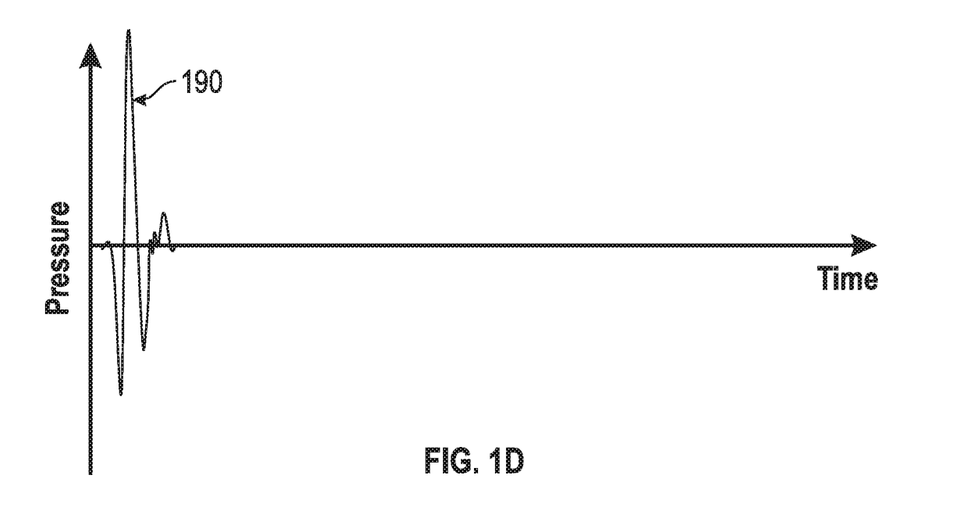
FIG. 1D is an exemplary diagram of an incident pressure profile recorded in the fluidic channel after induction of a pressure pulse.

The device 120 can be actuated and create the pressure pulse by the one or more hammers 122 striking and impacting the external surface of walls 107 of the fluidic channel 106. The hammers 122 can be electrical, mechanical, pneumatic, and/or hydraulic hammers. The hammers 122 can be any suitable object which can strike and impact the external surface of the walls 107, thereby creating a pressure pulse within the fluidic channel 106. For example, the hammers 122 can be any blunt object which does not damage the walls 107 of the fluidic channel 106 as the hammers 122 impact the walls 107. When the hammers 122 strike the walls 107, an acoustic pressure pulse is generated that travels upstream of the device 120. The device 120 can be electrically programmed, such that different pressures can be induced based on the strikes of the hammers 122. The harder the impact of the hammers 122 against the walls 107, the greater, or sharper, the pressure pulse. The striking of the hammers 122 against the walls 107 provides for a pulse with a higher resolution. FIG. 1D illustrates an exemplary diagram of an incident pressure profile 190 recorded in the fluidic channel 106 after induction of a pressure pulse by the device 120.

As the pressure pulse travels along the fluidic channel 106, any encountered obstructions or cross-sectional variations 1061 generate a reflected signal which is reflected back toward the device 120. The system 100 includes a sensor 130 to receive the reflected pressure pulse signals. The sensor 130 can be a known distance from the device 120. The sensor 130 can be a pressure transducer. In other examples, the sensor 130 can be any suitable sensor that measures pressure or stress of the fluid, for example a string gauge or an optical fiber transducer. The sensor 130 can be disposed within the annulus 109 of the fluidic channel 106. For example, the sensor 130, as illustrated in FIG. 1B, can be mounted to and/or inserted through a port 1061 of the fluidic channel 106. The port 1061 may be pre-existing, so the fluidic channel 106 does not need to be modified or disrupted to position the sensor 130. In other examples, the sensor 130 can be disposed external to the fluidic channel 106.

The reflected signals received by the sensor 130 are passed through a transmission system 115 to a data acquisition system 114 to be interpreted to map out and quantify any cross-sectional variations 150 in the fluidic channel 106. The data acquisition system 114 can be located at the surface, within a vehicle such as a submarine, or any other suitable location such that the data can be interpreted by an operator. The transmission system 115 can be wireline, optical fiber, wirelessly such as through the cloud or Bluetooth, or any other suitable method to transmit data. In at least one example, the transmission system 115 can additionally be coupled with the device 122 to send/receive instructions and/or data from the device 122.

Figure 2:
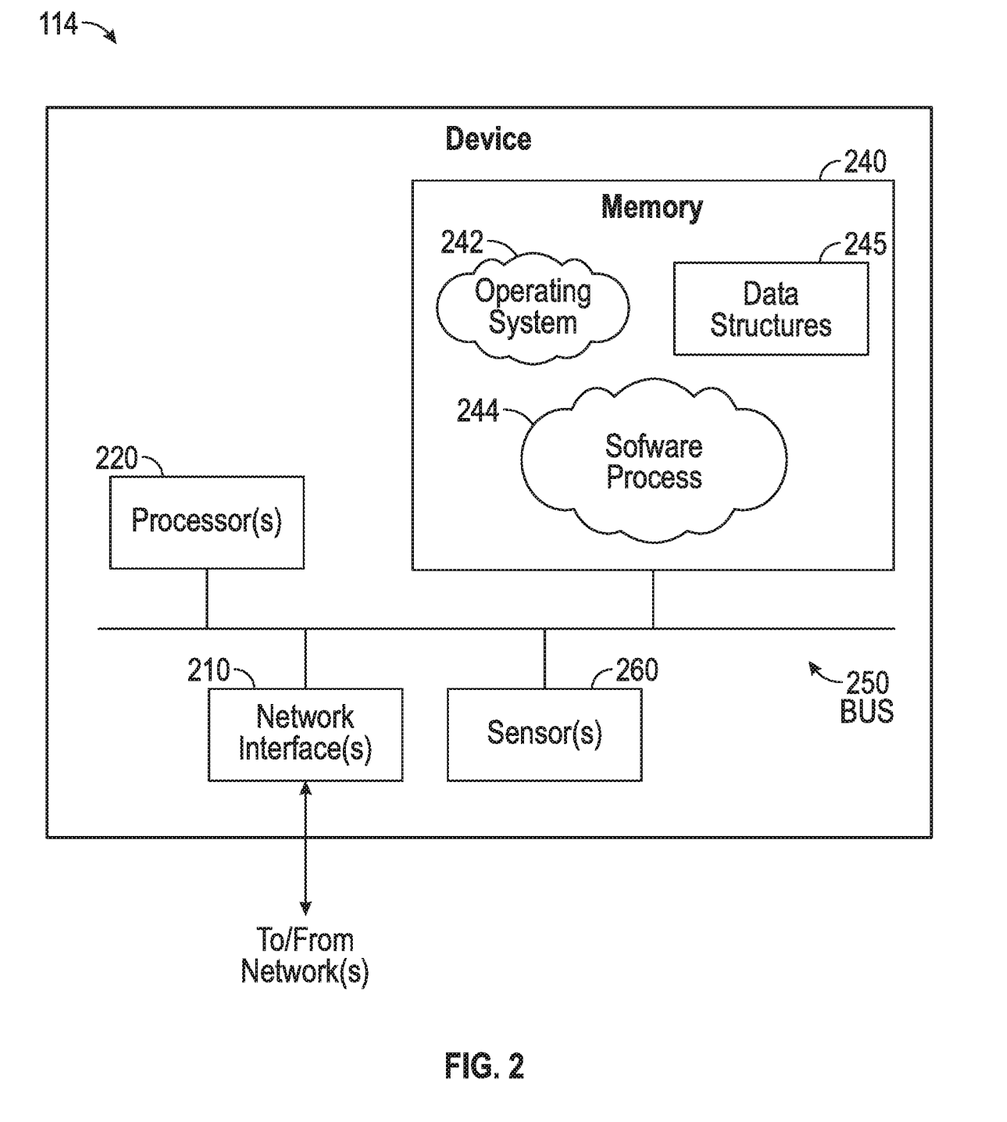
FIG. 2 is a schematic diagram of a data acquisition system which may be employed as shown in FIGS. 1A and 1B.

FIG. 2 is a block diagram of an exemplary data acquisition system 114. Data acquisition system 114 is configured to perform processing of data and communicate with the sensors 130, for example as illustrated in FIGS. 1A and 1B. In operation, data acquisition system 114 communicates with one or more of the above-discussed components and may also be configured to communication with remote devices/systems.

As shown, data acquisition system 114 includes hardware and software components such as network interfaces 210, at least one processor 220, sensors 260 and a memory 240 interconnected by a system bus 250. Network interface(s) 210 can include mechanical, electrical, and signaling circuitry for communicating data over communication links, which may include wired or wireless communication links. Network interfaces 210 are configured to transmit and/or receive data using a variety of different communication protocols, as will be understood by those skilled in the art.

Processor 220 represents a digital signal processor (e.g., a microprocessor, a microcontroller, or a fixed-logic processor, etc.) configured to execute instructions or logic to perform tasks in a wellbore environment. Processor 220 may include a general purpose processor, special-purpose processor (where software instructions are incorporated into the processor), a state machine, application specific integrated circuit (ASIC), a programmable gate array (PGA) including a field PGA, an individual component, a distributed group of processors, and the like. Processor 220 typically operates in conjunction with shared or dedicated hardware, including but not limited to, hardware capable of executing software and hardware. For example, processor 220 may include elements or logic adapted to execute software programs and manipulate data structures 245, which may reside in memory 240.

Sensors 260, which may include sensors 130 as disclosed herein, typically operate in conjunction with processor 220 to perform measurements, and can include special-purpose processors, detectors, transmitters, receivers, and the like. In this fashion, sensors 260 may include hardware/software for generating, transmitting, receiving, detection, logging, and/or sampling magnetic fields, seismic activity, and/or acoustic waves, or other parameters.

Memory 240 comprises a plurality of storage locations that are addressable by processor 220 for storing software programs and data structures 245 associated with the embodiments described herein. An operating system 242, portions of which may be typically resident in memory 240 and executed by processor 220, functionally organizes the device by, inter alia, invoking operations in support of software processes and/or services 244 executing on data acquisition system 114. These software processes and/or services 244 may perform processing of data and communication with data acquisition system 114, as described herein. Note that while process/service 244 is shown in centralized memory 240, some examples provide for these processes/services to be operated in a distributed computing network.

It will be apparent to those skilled in the art that other processor and memory types, including various computer-readable media, may be used to store and execute program instructions pertaining to the fluidic channel evaluation techniques described herein. Also, while the description illustrates various processes, it is expressly contemplated that various processes may be embodied as modules having portions of the process/service 244 encoded thereon. In this fashion, the program modules may be encoded in one or more tangible computer readable storage media for execution, such as with fixed logic or programmable logic (e.g., software/computer instructions executed by a processor, and any processor may be a programmable processor, programmable digital logic such as field programmable gate arrays or an ASIC that comprises fixed digital logic. In general, any process logic may be embodied in processor 220 or computer readable medium encoded with instructions for execution by processor 220 that, when executed by the processor, are operable to cause the processor to perform the functions described herein.

Additionally, the data acquisition system 114 can apply machine learning, such as a neural network or sequential logistic regression and the like, to determine relationships between the reflected signals from the pressure pulses received by the sensors 130. For example, a deep neural network may be trained in advance to capture the complex relationship between the reflected acoustic wave and the pipeline internal diameter variation. This neural net can then be deployed in the cross-sectional area estimation. As such, the determination of cross-sectional variations 150 within a fluidic channel 106 can be more accurate.

Figure 3:
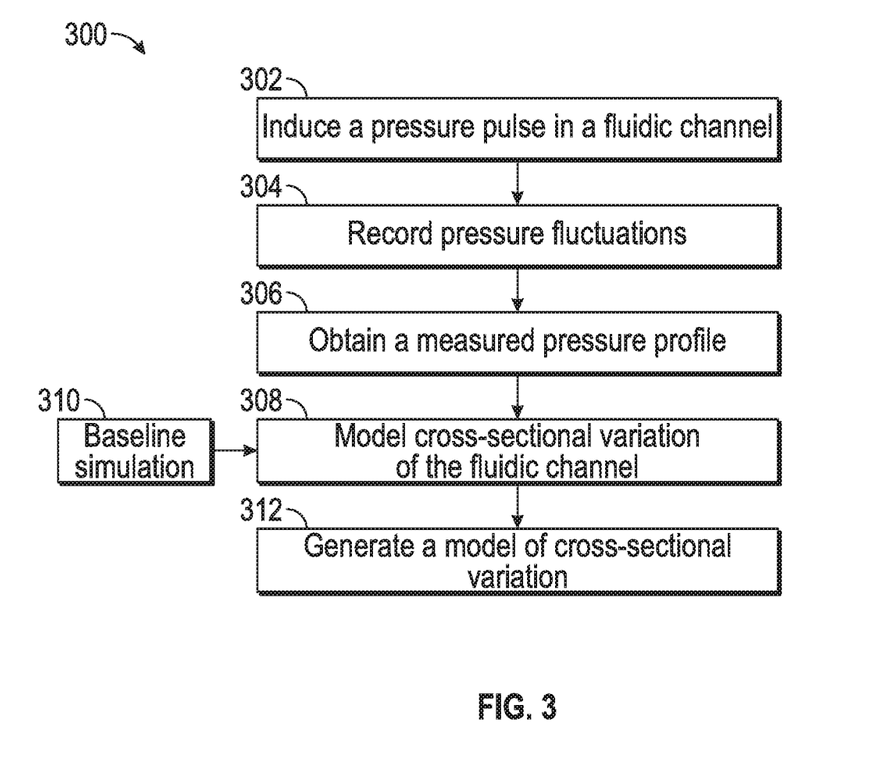
FIG. 3 is a flow chart of a method for generating a model of cross-sectional variation.

Referring to FIG. 3, a flowchart is presented in accordance with an example embodiment. The method 300 is provided by way of example, as there are a variety of ways to carry out the method. The method 300 described below can be carried out using the configurations illustrated in FIGS. 1A-2 and 4-7, for example, and various elements of these figures are referenced in explaining example method 300. Each block shown in FIG. 3 represents one or more processes, methods or subroutines, carried out in the example method 300. Furthermore, the illustrated order of blocks is illustrative only and the order of the blocks can change according to the present disclosure. Additional blocks may be added or fewer blocks may be utilized, without departing from this disclosure. The example method 300 can begin at block 302.

At block 302, a pressure pulse is induced in a fluidic channel as described above. For instance, one or more pressure pulses can be induced. For example, a sequence of pressure pulses of differing sharpness can be induced. In other examples, the pressure pulses may all have the same sharpness. In yet other examples, only one pressure pulse is induced. The pressure pulse is induced by a device which includes one or more hammers. The device includes a collar which couples the device with the external walls of the fluidic channel. The device is non-intrusive, as the device is deployed external to the fluidic channel. By striking the walls of the fluidic channels with the hammers, a pressure pulse is induced. As the hammers strike the walls with more force, the sharper the pressure pulse will be. The pressure pulse travels upstream in the fluidic channel and reflects off of any cross-sectional variations of the fluidic channel, for example obstructions such as deposits and/or deformation of the walls.

At block 304, the pressure fluctuations are then recorded by one or more sensors. The sensors are disposed within the annulus of the fluidic channel. The sensors may be mounted on and/or inserted through portals of the fluidic channel. In at least one example, the sensors are not disposed within the annulus of the fluidic channel and are disposed external to the fluidic channel. The data is then transmitted to a data acquisition system to interpret the data.

Figure 4:
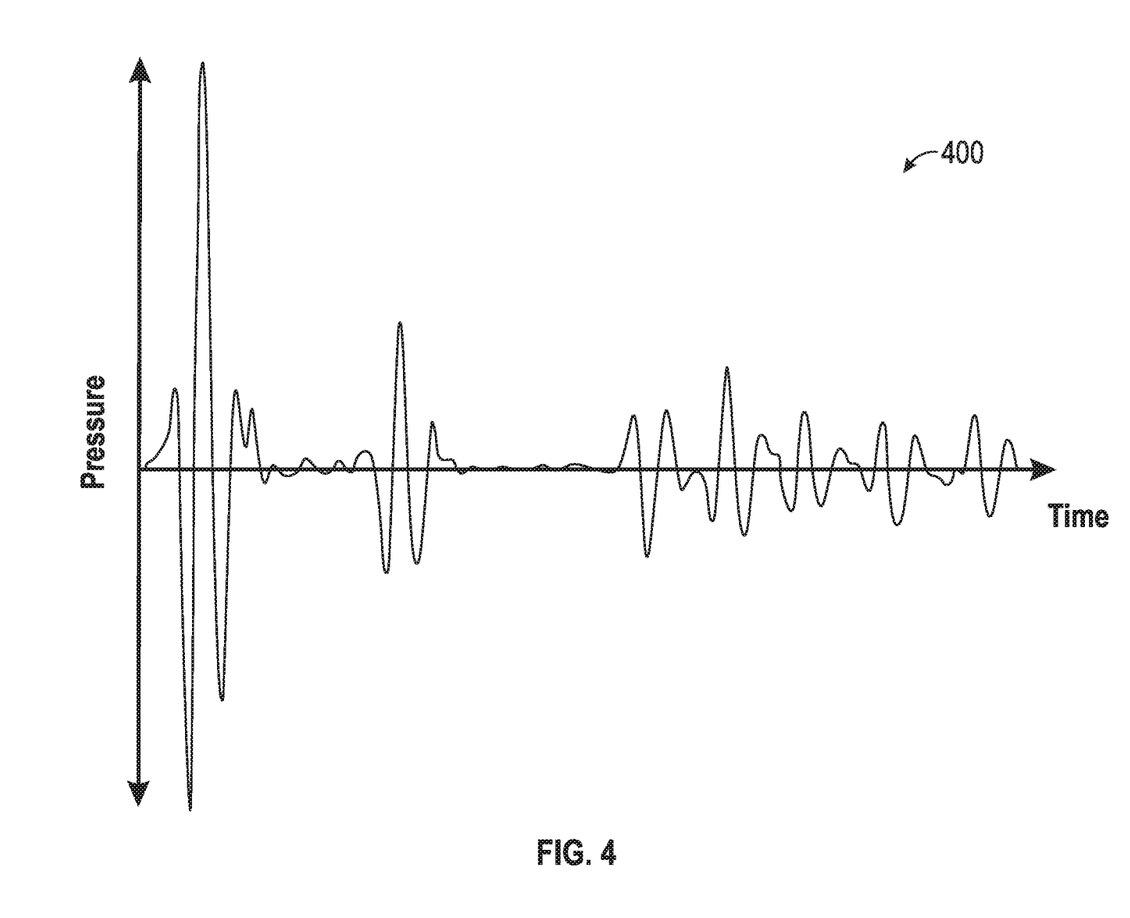
FIG. 4 is an exemplary diagram of a measured pressure profile.

At block 306, a measured pressure profile is obtained. The measured pressure profile, as shown in FIG. 4, is provided as a diagram 400 of pressure versus time. The diagram 400 illustrates the pressure spike created by the striking of the one or more hammers against the walls of the fluidic channel. Additionally, the diagram 400 illustrates pressure fluctuations which correspond to obstructions such as cross-sectional variations of the fluidic channel.

Referring back to FIG. 3, at block 308, the cross-sectional variations of the fluidic channel are modeled. The modeling can be performed by a data acquisition system which includes a non-transitory computer readable storage medium. The non-transitory computer readable storage medium includes at least one processor and stores instructions executable by the at least one processor. A machine learning approach may also be used for cross-section estimation. For example, a deep neural network may be trained in advance to capture the complex relationship between the reflected acoustic wave and the pipeline internal diameter variation. This neural net can then be deployed in the cross-sectional area estimation. To model the cross-sectional variations, a baseline simulation, at block 310, may be used. The baseline simulation is a simulation of the fluidic channel if there are no cross-sectional variations. The baseline simulation can be calculated using hydrodynamic equations by knowing information about the fluidic channel such as the fluid, the diameter and shape, the pressure pulse that would be created by the device, among other known data.

From the baseline simulation, a simulated pressure profile can be created. The model of the cross-sectional variations is then created by comparing the simulated pressure profile with the measured pressure profile and adjusting the simulated pressure profile until the simulated pressure profile and the measured pressure profile substantially match. To substantially match, the error between the simulated pressure profile and the measured pressure profile must fall within a predetermined threshold. Modeling the cross-sectional variations will be described in further detail in FIG. 5 below.

Referring back to FIG. 3, at block 312, if the simulated pressure profile and the measured pressure profile are substantially matching, an estimate of cross-sectional variations of the fluidic channel is generated.

Figure 5:
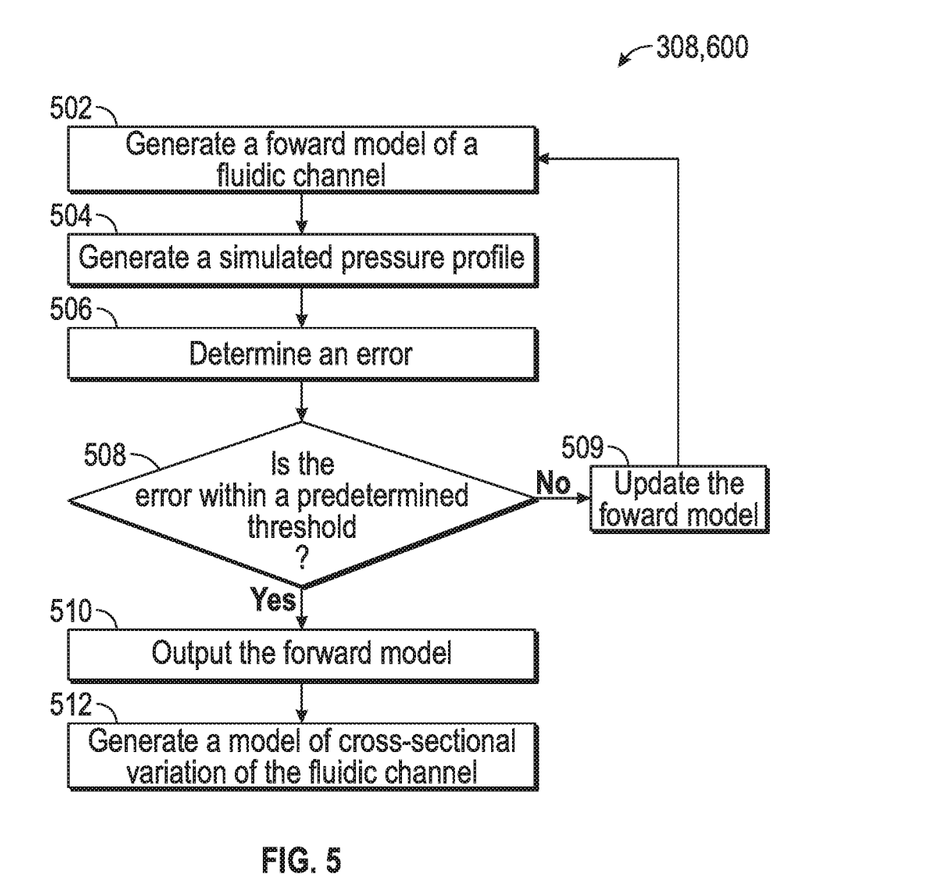
FIG. 5 is a flow chart of a method for outputting a forward model of deposits.

Referring to FIG. 5, a flowchart is presented in accordance with an example embodiment for modeling a cross-sectional variation of a fluidic channel, for example block 308 of FIG. 3. The method 500 is provided by way of example, as there are a variety of ways to carry out the method. The method 500 described below can be carried out using the configurations illustrated in FIGS. 1A-4 and 6-7, for example, and various elements of these figures are referenced in explaining example method 500. Each block shown in FIG. 5 represents one or more processes, methods or subroutines, carried out in the example method 500. Furthermore, the illustrated order of blocks is illustrative only and the order of the blocks can change according to the present disclosure. Additional blocks may be added or fewer blocks may be utilized, without departing from this disclosure. The example method 500 can be implemented using a data acquisition system, for example data acquisition system 114 as shown in FIGS. 1A, 1B, and 2, which includes a non-transitory computer readable storage medium. The non-transitory computer readable storage medium includes at least one processor and stores instructions executable by the at least one processor to implement the example method 500. The example method 500 can begin at block 502.

At block 502, a forward model of a fluidic channel is generated. The following algorithms provide exemplary equations to generate the forward model. While the above equations are used to calculate the forward model, the above equations are exemplary. Other methods to calculate cross-sectional variations can be used as applicable.

Figure 6:
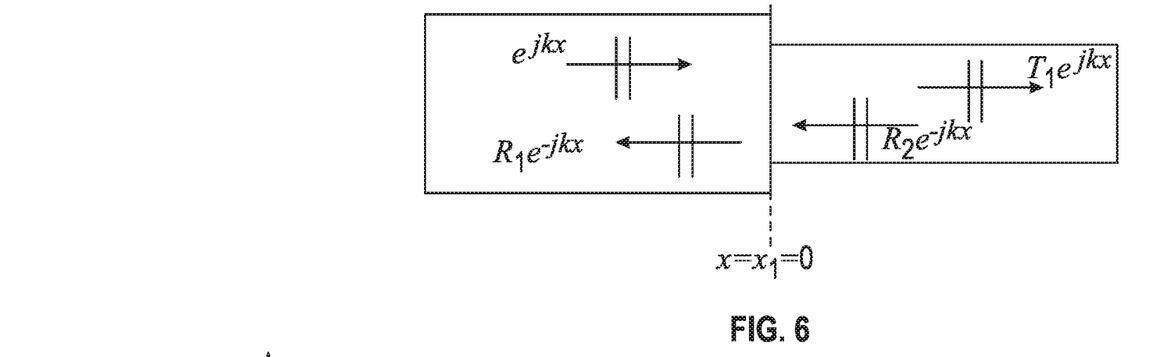
FIG. 6 an exemplary diagram for calculation of conditions in relation to a point where a pressure pulse is generated.

The forward model can simulate a plane-wave acoustic one-dimensional model in a fluidic channel with a changing cross-sectional area (for example, due to deposits). The model describes a complex value function F, such that:

$$F: e^{jkx} \to R_1 e^{-jkx} e^{-\alpha_1(x_1-x)f} \quad (1)$$

where x is the distance coordinate along the pipe, k is the wavenumber, $R_1$ is the reflection coefficient due to changes in the fluidic channel cross-section, $\alpha$ is the attenuation coefficient (usually in dB/m/Hz), and f is the frequency. The forward model is trying to solve the acoustic wave equation with certain boundary conditions at each location where there is a cross-sectional variation, for example, the boundary conditions listed below. FIG. 6 illustrates the calculation of conditions in relation to the point x=0 where the pressure pulse is generated. For example, the direction of the arrows indicates the direction of the pressure pulse.

Continuity in Pressure at $x=x_1=0$:

$$1+R_1 = T_1 + R_2 e^{-\alpha 2(x_2)} \quad (2)$$

$$\Rightarrow R_1 - T_1 - R_2 e^{-\alpha 2(x_2)} = -1 \quad (3)$$

where T is the transmission coefficient.

To solve for the reflection coefficient, the continuity of flow rate is calculated:

$$\nabla P = -\rho \frac{\partial u}{\partial t}$$

[Momentum Equation] (4)
  normal derivatives of $$P = \frac{\partial p}{\partial x}; \quad -\rho \frac{\partial u}{\partial t} = +\rho(j\omega)u \quad (5)$$

such that:

$$u = \frac{\partial p}{\partial x} \bigg/ j(\rho) \quad (6)$$

Equations (7) and (8) model the left hand side (LHS) of the boundary x=0, and Equations (9) and (10) model the right hand side (RHS) of the boundary x=0.
LHS:

$$[(jk_1)e^{jk_1x}/j\rho_1\omega + R_1[e^{-\alpha_1 f(x_1-x)} - jk_1xe^{-jk_1x} + e^{-jk_1x}\alpha_1 f e^{-\alpha_1 f(x_1-x)}]/J\rho_1\omega]A_1\rho_1 \quad (7)$$

$$[e^{jk_1x}/\rho_1 c_1 - R_1 e^{-\alpha_1 f(x_1-x)} e^{-jk_1x}/\rho_1 c_1 + R_1 e^{-jk_1x} e^{-\alpha_1 f(x_1-x)} \alpha_1/J2\pi\rho_1]A_1\rho_1 \quad (8)$$

At $x=x_1=0$
RHS:

$$A_2\rho_2 \left[ \frac{T_1}{J\rho_2\omega} [e^{-\alpha_2 f(x_1-x)} - jk_2 xe^{-jk_2 x} + e^{-jk_2 x}(-\alpha_2 f)e^{-\alpha_2 f(x-x_1)}] + \right. \quad (9)$$

$$\frac{R_2}{J\rho_2\omega} [e^{-\alpha_2(x_2-x)f} - jk_2 xe^{-jk_2 x} + e^{-jk_2 x}\alpha_2 f e^{-\alpha_2 f(x_2-x)}] \Big]$$

$$A_2\rho_2 \left[ T_1 \left[ \frac{1}{\rho_2 c_2} + \frac{j\alpha_2}{\rho_2(2\pi)} \right] + R_2 \left[ -e^{-\alpha_2 f x_2} - j\frac{\alpha_2 e^{-\alpha_2 x_2 f}}{2\pi\rho_2} \right] \right] \quad (10)$$

As there are no incoming reflections from the LHS, Equations (11) and (12) are a condensed set of equations for the LHS.

LHS:

$$\left[ \frac{1}{Z_1} - \frac{R_1}{Z_1} - j\frac{R_1\alpha_1}{2\pi\rho_1} \right] \rho_1 A_1 \quad (11)$$

$$\frac{A_1}{C_1} - \frac{R_1 A_1}{C_1} - j\frac{R_1 A_1 \alpha_1}{2\pi} \quad (12)$$

Finally, a set of linear equations are solved to obtain, for example, the reflection and transmission coefficients due to the presence of multiple interfaces of cross-section variations.

The forward model is based on the baseline simulation. The forward model incorporates an initial guess at cross-sectional variations, or estimated cross-sectional variations, at desired grid points. The grid points may be 1 meter, 10 meters, 20 meters, 100 meters, or any desired resolution. The initial guess at cross-sectional variations includes, for example, any known cross-sectional variations. The known cross-sectional variations may be known because of previous experience or known cross-sectional variations of the fluidic channel. The initial guess at cross-sectional variations can also be set at 0, which provides that no cross-sectional variations are known.

The forward model can also incorporate a pressure pulse inducing profile. The pressure pulse inducing profile includes how the device created a pressure pulse, for example, how much force was used and/or the sequences of striking the walls. As such, the pressure pulse inducing profile includes the known information of the pressure pulses and known reflections that would occur from any known cross-sectional variations of the fluidic channel.

At block 504, a simulated pressure profile is generated from the forward model. The simulated pressure profile is a diagram of pressure versus time and reflects the initial pressure spike from the device creating the pressure pulse and pressure fluctuations from the pressure pulse reflecting off of estimated cross-sectional variations of the fluidic channels such as deposits.

At block 506, an error is determined. The error indicates an amount that the simulated pressure profile does not correspond to the measured pressure profile. To calculate the error, the measured pressure profile from the at least one sensor is utilized. The error is calculated based on the difference between the measured pressure profile and the simulated pressure profile. The error can be calculated using the equation:

Error=|measured pressure profile−simulated pressure profile|².

At block 508, the error is compared with a predetermined threshold. If the error is not within the predetermined threshold, the forward model is updated at block 609. The updated inputs (for example the cross-sectional variations as a function of range) to the forward model can be calculated using the equation:

Updated cross-sectional variation=current cross-sectional variation+function(error).

As such, the forward model is adjusted based on the error. The steps of generating a forward model 502, generating a simulated pressure profile 504, determining an error 506, determining whether the error is within, or less than, a predetermined error 508, and updating the forward model 509 are repeated until the error is within the predetermined threshold.

By basing the adjustments to the forward model on the error, the processing time can be reduced, for example, from 2 to 4 hours to 2 to 5 minutes on average.

If the error is within the predetermined threshold, then at block 510, the forward model is outputted.

At block 512, an estimate of cross-sectional variations of the fluidic channel is then generated and outputted. When a pressure disturbance is created in a fluidic channel, the pressure pulse travels as a wave with a speed equal to the local sound speed of the fluid within the fluidic channel. As the pressure pulse travels, any changes to the fluidic channel characteristic (or impedance) results in reflection of at least a portion of the fluidic channel.

Figure 7:
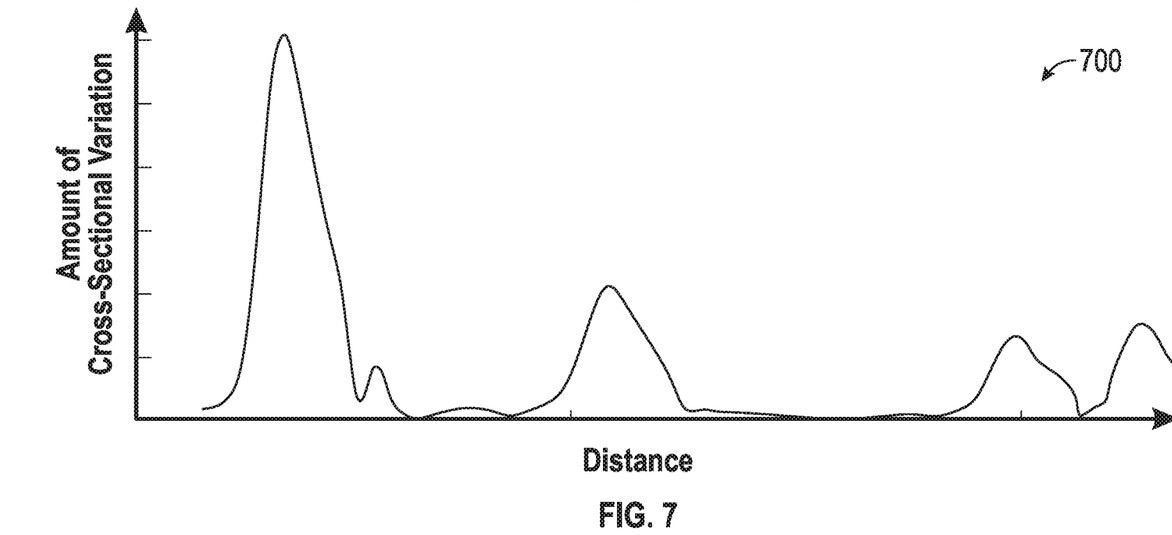
FIG. 7 is an exemplary diagram of a model of cross-sectional variations of a fluidic channel.

FIG. 7 illustrates an exemplary diagram 700 of a model or an estimate of cross-sectional variations of the fluidic channel. The exemplary diagram 700 provides for amount of cross-sectional variations versus distance from the device and/or sensor. As illustrated in FIG. 7, the model of cross-sectional variations of the fluidic channel provides for a visualization of the amount cross-sectional variation at each point of the fluidic channel. For example, as illustrated in FIG. 7, the fluidic channel has cross-sectional variations at one or more distances.

After the model of cross-sectional variations is generated and outputted, adjustments to the fluidic channel can be made. For example, the fluidic channel can be inspected at certain points with greater cross-sectional variation. In other examples, the portion of the fluidic channel with cross-sectional variation can be repaired and/or replaced by any suitable method.

Numerous examples are provided herein to enhance understanding of the present disclosure. A specific set of statements are provided as follows.

Statement 1: A method for non-intrusively determining cross-sectional variation of a fluidic channel is disclosed, the method comprising: creating a pressure pulse in a fluidic channel, using a hammer to strike an external surface of a fluidic channel; sensing, by one or more sensors, reflections of the pressure pulse; obtaining, from the one or more sensors, a measured pressure profile based on the sensed reflections of the pressure pulse; generating a forward model of cross-sectional variation of the fluidic channel based on a baseline simulation; generating, using the forward model, a simulated pressure profile; determining, using the measured pressure profile and the simulated pressure profile, an error; updating, when the error is outside a predetermined threshold, the forward model based on the error; and displaying an estimate of cross-sectional variation of the fluidic channel based on the forward model.

Statement 2: A method is disclosed according to Statement 1, wherein the hammer is positioned external to the fluidic channel.

Statement 3: A method is disclosed according to Statements 1 or 2, wherein the hammer is coupled with a collar; and wherein the collar is coupled with the fluidic channel by wrapping at least partially around the fluidic channel.

Statement 4: A method is disclosed according to any of preceding Statements 1-3, further comprising: outputting, when the error is within the predetermined threshold, the forward model; generating, using the forward model, an estimate of cross-sectional variation of the fluidic channel.

Statement 5: A method is disclosed according to Statement 4, wherein the estimate of cross-sectional variation is provided as a function of amount of estimated cross-sectional variation of the fluidic channel versus distance in the fluidic channel from the one or more sensors.

Statement 6: A method is disclosed according to any of preceding Statements 1-5, further comprising: repeating, until the error is within the predetermined threshold, generating the forward model, generating the simulated pressure profile, determining the error, and updating the forward model.

Statement 7: A method is disclosed according to any of preceding Statements 1-6, wherein the cross-sectional variation includes a shape change of the fluidic channel and/or a change or cross-sectional area of the fluidic channel.

Statement 8: A system is disclosed for non-intrusively determining cross-sectional variation of a fluidic channel, the system comprising: a hammer configured to strike an external surface of a fluidic channel upon actuation; one or more sensors operable to sense reflections of the pressure pulse and measure a pressure profile; and a non-transitory computer readable storage medium including at least one processor and storing instructions executable by the at least one processor to: actuate the hammer to create a pressure pulse; obtain, from the one or more sensors, the measured pressure profile based on the sensed reflections of the pressure pulse; generate a forward model of cross-sectional variation of the fluidic channel based on a baseline simulation; generate, using the forward model, a simulated pressure profile; determine, using the measured pressure profile and the simulated pressure profile, an error; update, when the error is outside a predetermined threshold, the forward model based on the error; and display an estimate of cross-sectional variation of the fluidic channel based on the forward model.

Statement 9: A system is disclosed according to Statement 8, wherein the hammer is positioned external to the fluidic channel.

Statement 10: A system is disclosed according to Statements 8 or 9, wherein the instructions further include to: output, when the error is within the predetermined threshold, the forward model; generate, using the forward model, an estimate of cross-sectional variation of the fluidic channel.

Statement 11: A system is disclosed according to Statement 10, wherein the estimate of cross-sectional variation is provided as a function of amount of estimated cross-sectional variation of the fluidic channel versus distance in the fluidic channel from the one or more sensors.

Statement 12: A system is disclosed according to any of preceding Statements 8-11, wherein the instructions further include to: repeat, until the error is within the predetermined threshold, generate the forward model, generate the simulated pressure profile, determine the error, and update the forward model.

Statement 13: A system is disclosed according to any of preceding Statements 8-12, wherein the cross-sectional variation includes a shape change of the fluidic channel.

Statement 14: A system is disclosed according to any of preceding Statements 8-13, wherein the cross-sectional variation includes a change of cross-sectional area of the fluidic channel.

Statement 15: A non-transitory computer readable storage medium is disclosed comprising at least one processor and storing instructions executable by the at least one processor to: actuate a hammer to strike an external surface of a fluidic channel upon actuation to creating a pressure pulse; obtain, from one or more sensors, a measured pressure profile based on sensed reflections of the pressure pulse; generate a forward model of cross-sectional variation of the fluidic channel based on a baseline simulation; generate, using the forward model, a simulated pressure profile; determine, using the measured pressure profile and the simulated pressure profile, an error; update, when the error is outside a predetermined threshold, the forward model based on the error; and display an estimate of cross-sectional variation of the fluidic channel based on the forward model.

Statement 16: A non-transitory computer readable storage medium is disclosed according to Statement 15, wherein the hammer is positioned external to the fluidic channel.

Statement 17: A non-transitory computer readable storage medium is disclosed according to Statements 15 or 16, wherein the hammer is coupled with a collar; and wherein the collar is coupled with the fluidic channel by wrapping at least partially around the fluidic channel.

Statement 18: A non-transitory computer readable storage medium is disclosed according to any of preceding Statements 15-17, wherein the instructions further include to: output, when the error is within the predetermined threshold, the forward mode; generate, using the forward model, an estimate of cross-sectional variation of the fluidic channel.

Statement 19: A non-transitory computer readable storage medium is disclosed according to Statement 18, wherein the estimate of cross-sectional variation is provided as a function of amount of estimated cross-sectional variation of the fluidic channel versus distance in the fluidic channel from the one or more sensors.

Statement 20: A non-transitory computer readable storage medium is disclosed according to any of preceding Statements 15-19, wherein the instructions further include to: repeat, until the error is within the predetermined threshold, generate the forward model, generate the simulated pressure profile, determine the error, and update the forward model.

The disclosures shown and described above are only examples. Even though numerous characteristics and advantages of the present technology have been set forth in the foregoing description, together with details of the structure and function of the present disclosure, the disclosure is illustrative only, and changes may be made in the detail, especially in matters of shape, size and arrangement of the parts within the principles of the present disclosure to the full extent indicated by the broad general meaning of the terms used in the attached claims. It will therefore be appreciated that the examples described above may be modified within the scope of the appended claims.

What is claimed is:

1. A method for non-intrusively determining cross-sectional variation of a fluidic channel, the method comprising:
   creating a pressure pulse in a fluidic channel using a hammer to strike an external surface of a fluidic channel;
   sensing, by one or more sensors, reflections of the pressure pulse;
   obtaining, from the one or more sensors, a measured pressure profile based on the sensed reflections of the pressure pulse;
   generating a forward model of cross-sectional variation of the fluidic channel based on a baseline simulation;
   determining based on the forward model an amount of the cross-sectional variation versus distance from one or more sensors;
   generating, using the forward model, a simulated pressure profile;
   determining, using the measured pressure profile and the simulated pressure profile, an error; and
   updating, when the error is outside a predetermined threshold, the forward model based on the error;
   displaying an estimate of cross-sectional variation of the fluidic channel based on the forward model where the estimate of cross-sectional variation is provided as a function of amount of estimated cross-sectional variation of the fluidic channel versus distance in the fluidic channel from the one or more sensors.

2. The method of claim 1, wherein the hammer is positioned external to the fluidic channel.

3. The method of claim 1, wherein the hammer is coupled with a collar; and
   wherein the collar is coupled with the fluidic channel by wrapping at least partially around the fluidic channel.

4. The method of claim 1, further comprising:
   outputting, when the error is within the predetermined threshold, the forward model;
   generating, using the forward model, an estimate of cross-sectional variation of the fluidic channel.

5. The method of claim 1, further comprising:
   repeating, until the error is within the predetermined threshold, generating the forward model, generating the simulated pressure profile, determining the error, and updating the forward model.

6. The method of claim 1, wherein the cross-sectional variation includes a shape change of the fluidic channel and/or a change of cross-sectional area of the fluidic channel.

7. A system for non-intrusively determining cross-sectional variation of a fluidic channel, the system comprising:
   a hammer configured to strike an external surface of a fluidic channel upon actuation;
   one or more sensors operable to sense reflections of the pressure pulse and measure a pressure profile; and
   a non-transitory computer readable storage medium including at least one processor and storing instructions executable by the at least one processor to:
   actuate the hammer to create a pressure pulse;
   obtain, from the one or more sensors, the measured pressure profile based on the sensed reflections of the pressure pulse;
   generate a forward model of cross-sectional variation of the fluidic channel based on a baseline simulation;
   determine based on the forward model an amount of the cross-sectional variation versus distance from one or more sensors;
   generate, using the forward model, a simulated pressure profile;
   determine, using the measured pressure profile and the simulated pressure profile, an error;
   update, when the error is outside a predetermined threshold, the forward model based on the error; and
   display an estimate of cross-sectional variation of the fluidic channel based on the forward model an estimate of cross-sectional variation of the fluidic channel based on the forward model where the estimate of cross-sectional variation is provided as a function of amount of estimated cross-sectional variation of the fluidic channel versus distance in the fluidic channel from the one or more sensors.

8. The system of claim 7, wherein the hammer is positioned external to the fluidic channel.

9. The system of claim 7, wherein the instructions further include to:
   output, when the error is within the predetermined threshold, the forward model;
   generate, using the forward model, an estimate of cross-sectional variation of the fluidic channel.

10. The system of claim 7, wherein the instructions further include to:

repeat, until the error is within the predetermined threshold, generate the forward model, generate the simulated pressure profile, determine the error, and update the forward model.

11. The system of claim 7, wherein the cross-sectional variation includes a shape change of the fluidic channel.

12. The system of claim 7, wherein the cross-sectional variation includes a change of cross-sectional area of the fluidic channel.

13. A non-transitory computer readable storage medium comprising at least one processor and storing instructions executable by the at least one processor to:
   actuate a hammer to strike an external surface of a fluidic channel upon actuation to creating a pressure pulse;
   obtain, from one or more sensors, a measured pressure profile based on sensed reflections of the pressure pulse;
   generate a forward model of cross-sectional variation of the fluidic channel based on a baseline simulation;
   determine based on the forward model an amount of the cross-sectional variation versus distance from one or more sensors;
   generate, using the forward model, a simulated pressure profile;
   determine, using the measured pressure profile and the simulated pressure profile, an error;
   update, when the error is outside a predetermined threshold, the forward model based on the error; and
   display an estimate of cross-sectional variation of the fluidic channel based on the forward model where the estimate of cross-sectional variation is provided as a function of amount of estimated cross-sectional variation of the fluidic channel versus distance in the fluidic channel from the one or more sensors.

14. The non-transitory computer readable storage medium of claim 13, wherein the hammer is positioned external to the fluidic channel.

15. The non-transitory computer readable storage medium of claim 13, wherein the hammer is coupled with a collar ; and wherein the collar is coupled with the fluidic channel by wrapping at least partially around the fluidic channel.

16. The non-transitory computer readable storage medium of claim 13, wherein the instructions further include to:
   output, when the error is within the predetermined threshold, the forward model;
   generate, using the forward model, an estimate of cross-sectional variation of the fluidic channel.

17. The non-transitory computer readable storage medium of claim 13, wherein the instructions further include to:
   repeat, until the error is within the predetermined threshold, generate the forward model, generate the simulated pressure profile, determine the error, and update the forward model.

* * * * *